(12) United States Patent
Tchoryk et al.

(10) Patent No.: US 7,104,505 B2
(45) Date of Patent: Sep. 12, 2006

(54) AUTONOMOUS SATELLITE DOCKING SYSTEM

(75) Inventors: Pete Tchoryk, Ann Arbor, MI (US);
Jane Pavlich, Ann Arbor, MI (US);
Greg Wassick, Petersburg, MI (US);
Anthony B. Hays, Howell, MI (US);
Greg Ritter, Hamburg, MI (US)

(73) Assignee: Michigan Aerospace Corporation, Ann Arbor, MI (US)

( * ) Notice: Subject to any disclaimer, the term of this patent is extended or adjusted under 35 U.S.C. 154(b) by 0 days.

(21) Appl. No.: 10/421,492

(22) Filed: Apr. 23, 2003

(65) Prior Publication Data

US 2003/0192995 A1 Oct. 16, 2003

Related U.S. Application Data

(63) Continuation-in-part of application No. 10/286,192, filed on Nov. 1, 2002.

(60) Provisional application No. 60/416,138, filed on Oct. 4, 2002, and provisional application No. 60/335,563, filed on Nov. 1, 2001.

(51) Int. Cl.
*B64G 1/64* (2006.01)

(52) U.S. Cl. ........................................ 244/161; 244/115
(58) Field of Classification Search ............. 244/135 A, 244/161, 115, 116; 294/82.28, 83
See application file for complete search history.

(56) References Cited

U.S. PATENT DOCUMENTS 2,199,588 A   5/1940   Cobham et al. ........ 244/135 A
2,761,636 A   9/1956   Finlay ........................ 244/113

(Continued)

OTHER PUBLICATIONS

P. Tchoryk Jr., M.E. Dobbs, D.J. Conrad, M.P. Frazer, D.K. Slayton, "Autonomous Rendevous and Docking Using an Expendable Launch Vehicle," *AIAA/Utah State University Conference on Small Satellites*, Poster Paper, Logan, Utah, Aug. 27–29, 1991.
Quintero, Montgomery, Tchoryk, "Autonomous Rendevous and Docking Scenarios for Guidelines and Standards," *AIAA Space Programs Conference Proceedings*, Huntsville, AL, Sep. 21–23, 1993.
P. Tchoryk, A. Hays, J. Pavlich, G. Ritter, G. Wassick, C. Nardell, G. Sypitkowski, "Autonomous Satellite Docking System," *AJAA Space 2001 Conference and Exhibition*, Albuquerque, NM, Aug. 28–30, 2001.

(Continued)

*Primary Examiner*—Galen Barefoot
(74) *Attorney, Agent, or Firm*—Raggio & Dinnin, P.C.

(57) ABSTRACT

This invention solves problems associated with prior-art soft-dock mechanisms by placing all active components of a soft-dock system on the chaser side of the mechanism, leaving the target side of the mechanism completely passive (i.e., requiring no power expenditure or self-actuated moving parts to operate). In particular, the active components are supported on the end of a flexible cable attached to the probe, or chaser, side of the device. These components act as a sort of spring-loaded "trap." Once the end of the probe passes into a receptacle on the target side, the mechanism is triggered, engaging it in such a way that it can no longer be pulled out of the receptacle until it is reset. The soft-docking cable may be replaced with a rigid, semi-rigid or jointed post that is used to bring a capture mechanism into engagement with its corresponding receptacle or receiving structure. The magnetic end effector may also be implemented as an electro-magnet, which requires power to maintain the holding force, or a permanent magnet, which captures a target without power. The main target cone may be either a metallic cone: or a non-metallic cone constructed of fabric, plastic, or other flexible material.

57 Claims, 10 Drawing Sheets

U.S. PATENT DOCUMENTS

| | | | | |
|---|---|---|---|---|
| 3,009,729 A | * | 11/1961 | Eskin | 294/82.28 |
| 3,201,065 A | | 8/1965 | Dunn | 244/1 |
| 3,389,877 A | * | 6/1968 | Huber et al. | 244/161 |
| 3,478,986 A | * | 11/1969 | Fogarty | 244/161 |
| 3,508,723 A | * | 4/1970 | Warren et al. | 244/161 |
| 3,737,117 A | | 6/1973 | Belew | 244/161 |
| 3,753,536 A | | 8/1973 | White | 244/161 |
| 4,083,520 A | | 4/1978 | Rupp et al. | 244/167 |
| 4,119,051 A | * | 10/1978 | Orndorff, Jr. | 244/161 |
| 4,177,964 A | * | 12/1979 | Hujsak et al. | 244/161 |
| 4,195,804 A | * | 4/1980 | Hujsak et al. | 244/161 |
| 4,381,092 A | * | 4/1983 | Barker | 244/161 |
| 4,391,423 A | | 7/1983 | Pruett et al. | 244/161 |
| 4,431,333 A | | 2/1984 | Chandler | 403/322.3 |
| 4,500,057 A | | 2/1985 | Duwelz | 244/161 |
| 4,573,725 A | * | 3/1986 | Griffiths | 294/82.28 |
| 4,588,150 A | | 5/1986 | Bock et al. | 244/161 |
| 4,607,815 A | | 8/1986 | Turci et al. | 244/161 |
| 4,709,454 A | | 12/1987 | Barnes | 24/573.11 |
| 4,712,753 A | | 12/1987 | Howard | 244/161 |
| 4,906,123 A | | 3/1990 | Weskamp et al. | 403/322.2 |
| 5,364,046 A | | 11/1994 | Dobbs et al. | 244/161 |
| 5,735,488 A | * | 4/1998 | Schneider | 244/161 |
| 6,299,107 B1 | * | 10/2001 | Kong et al. | 244/161 |

OTHER PUBLICATIONS

P. Tchoryk, A. Hays, J. Pavlich, "Modeling and Simulation of a Autonomous Satellite Docking Systems," AIAA 2001 Core Technologies for Space Systems Conference, Nov. 28–30, 2001, Colorado Springs, CO.

P. Tchoryk, Jr., Anthony B. Hays, Jane C. Pavlich; "A Docking Solution for On–Orbit Satellite Servicing: Part of the Responsive Space Equation," AIAA–LA Section/SSTC 2003–2001 Responsive Space Conference Apr. 1–3, 2003.

J. Pavlich, P. Tchoryk, Jr., A. Hays, G. Wassick, "KC–135 Zero–G Testing of a Micro–Satellite Docking Mechanism," SPIE AeroSense Symposium, Space Systems Technology and Operations Conference, Orlando, FL, Apr. 21–25, 2003.

A.B. Hays, P. Tchoryk, Jr., J. Pavlich, G. Wassick, "Dynamic Simulation and Validation of a Satellite Docking System," SPIE AeroSense Symposium, Space Systems Technology and Operations Conference, Orlando, FL, Apr. 21–25, 2003.

* cited by examiner

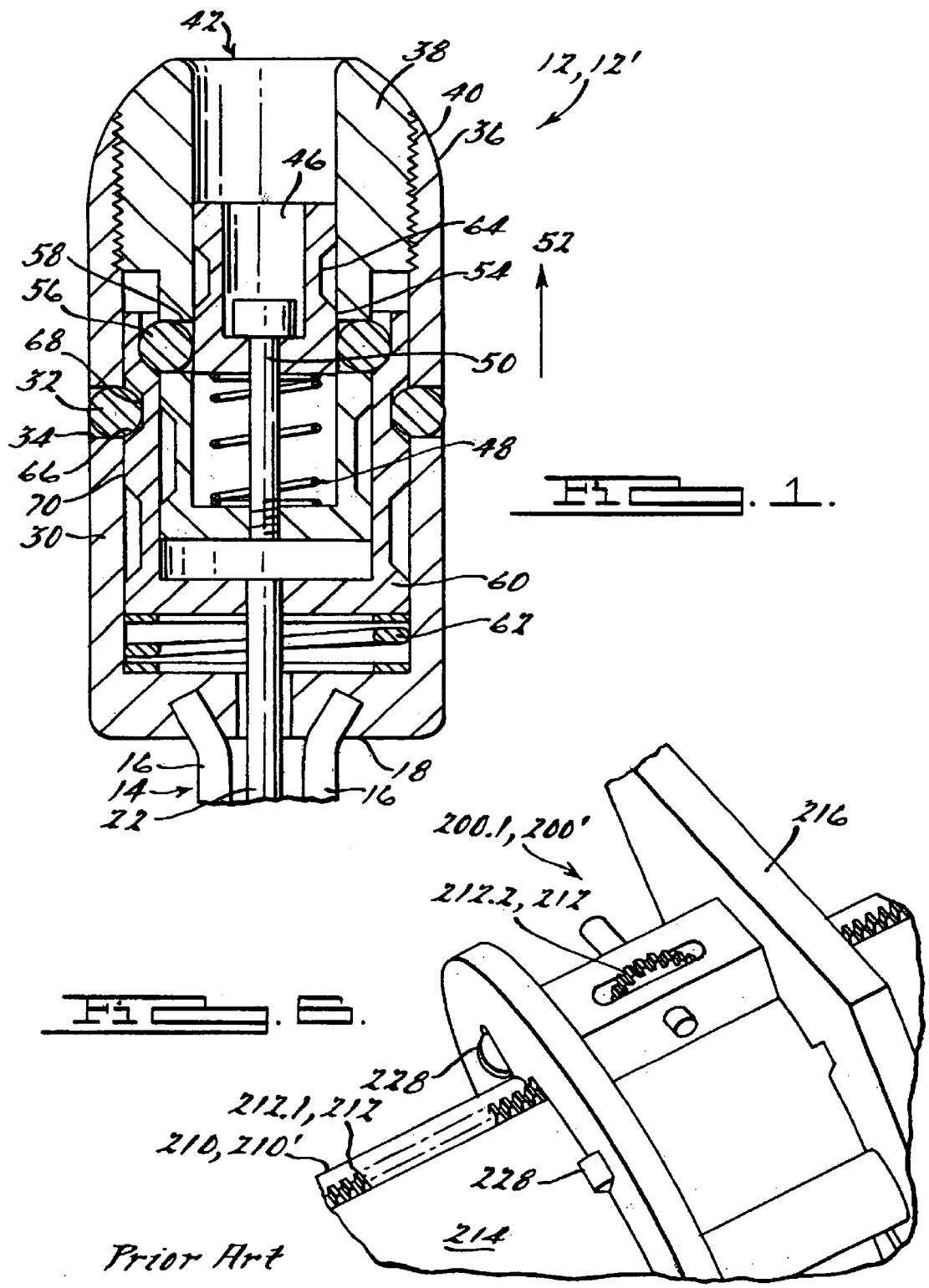

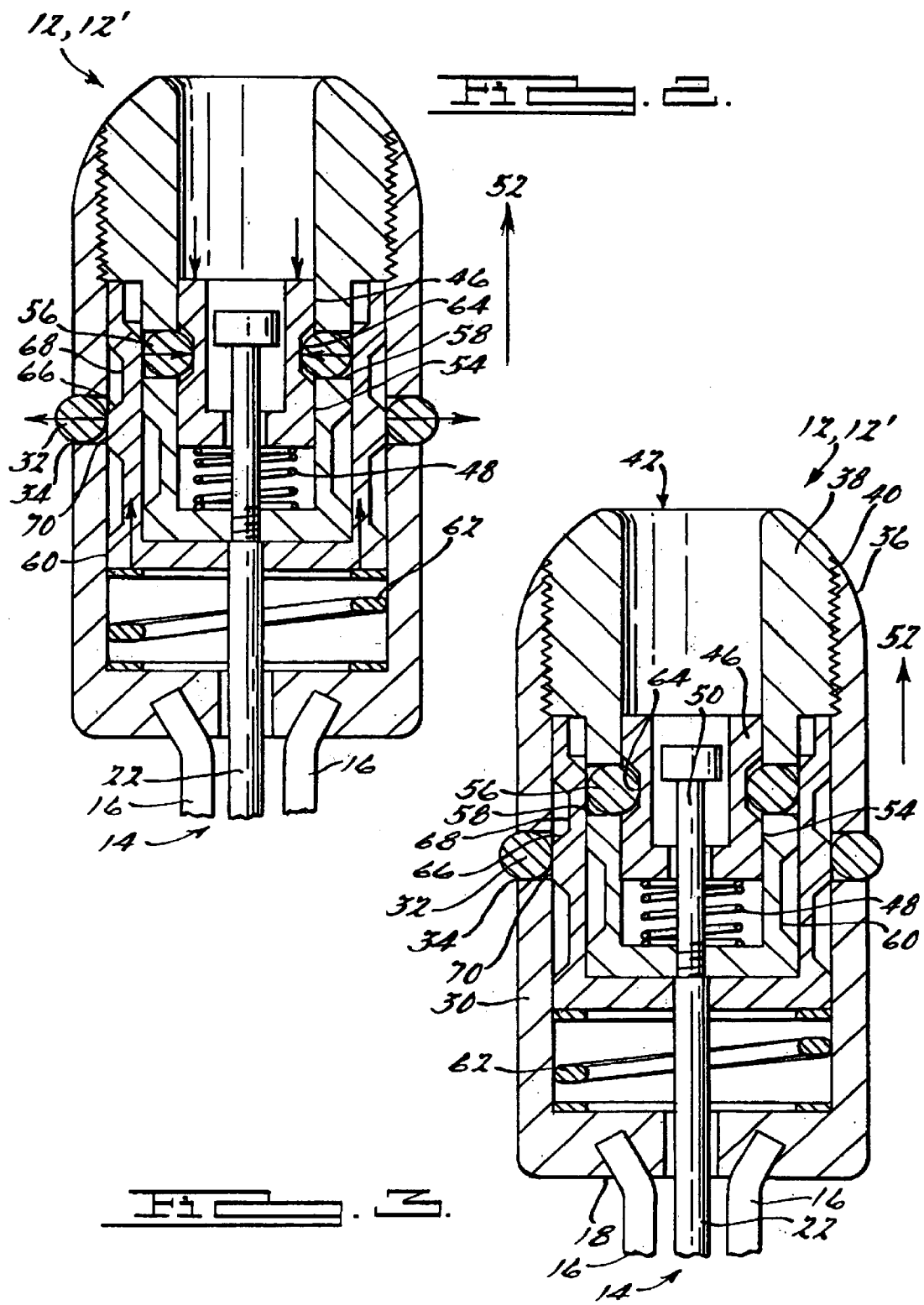

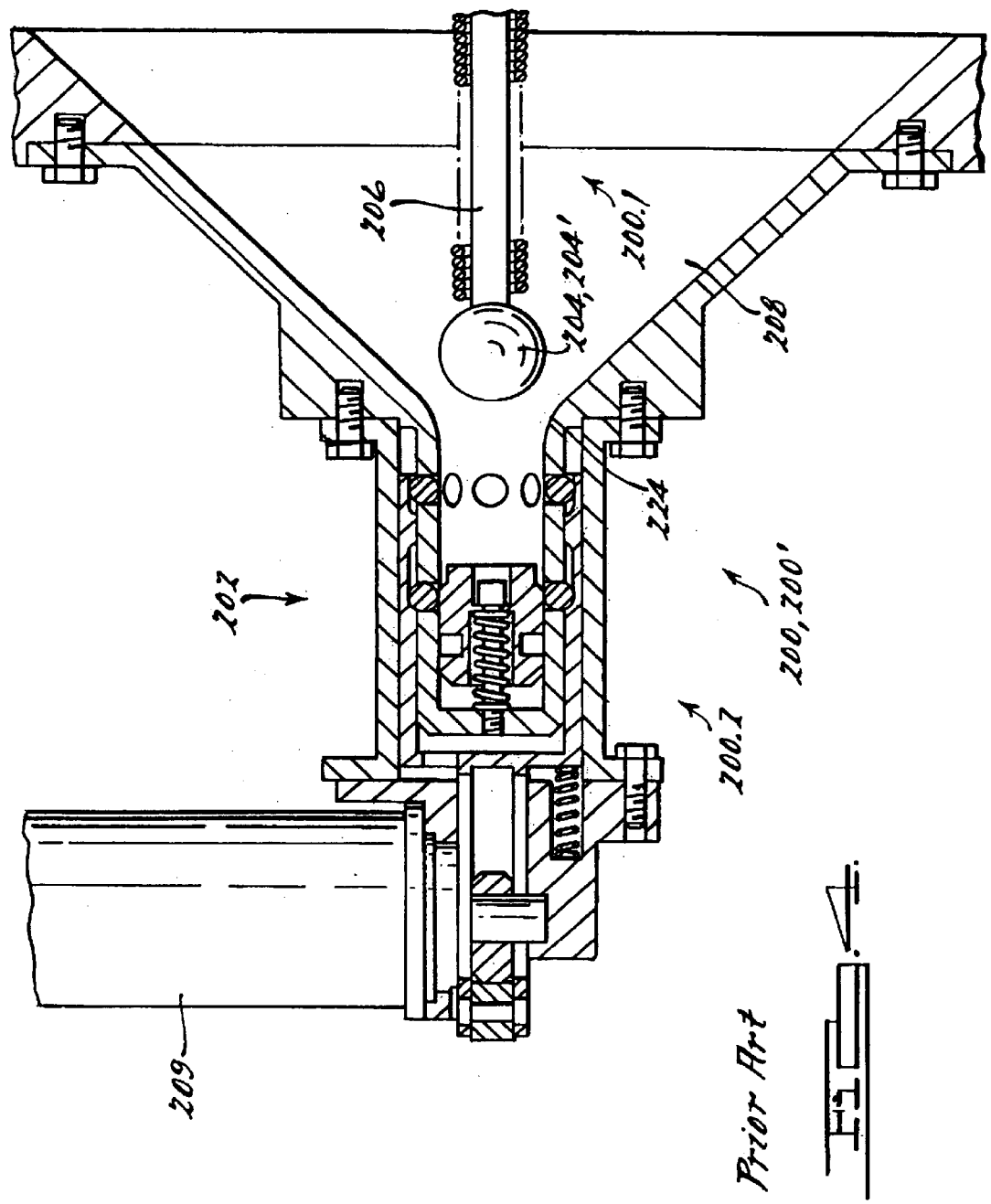

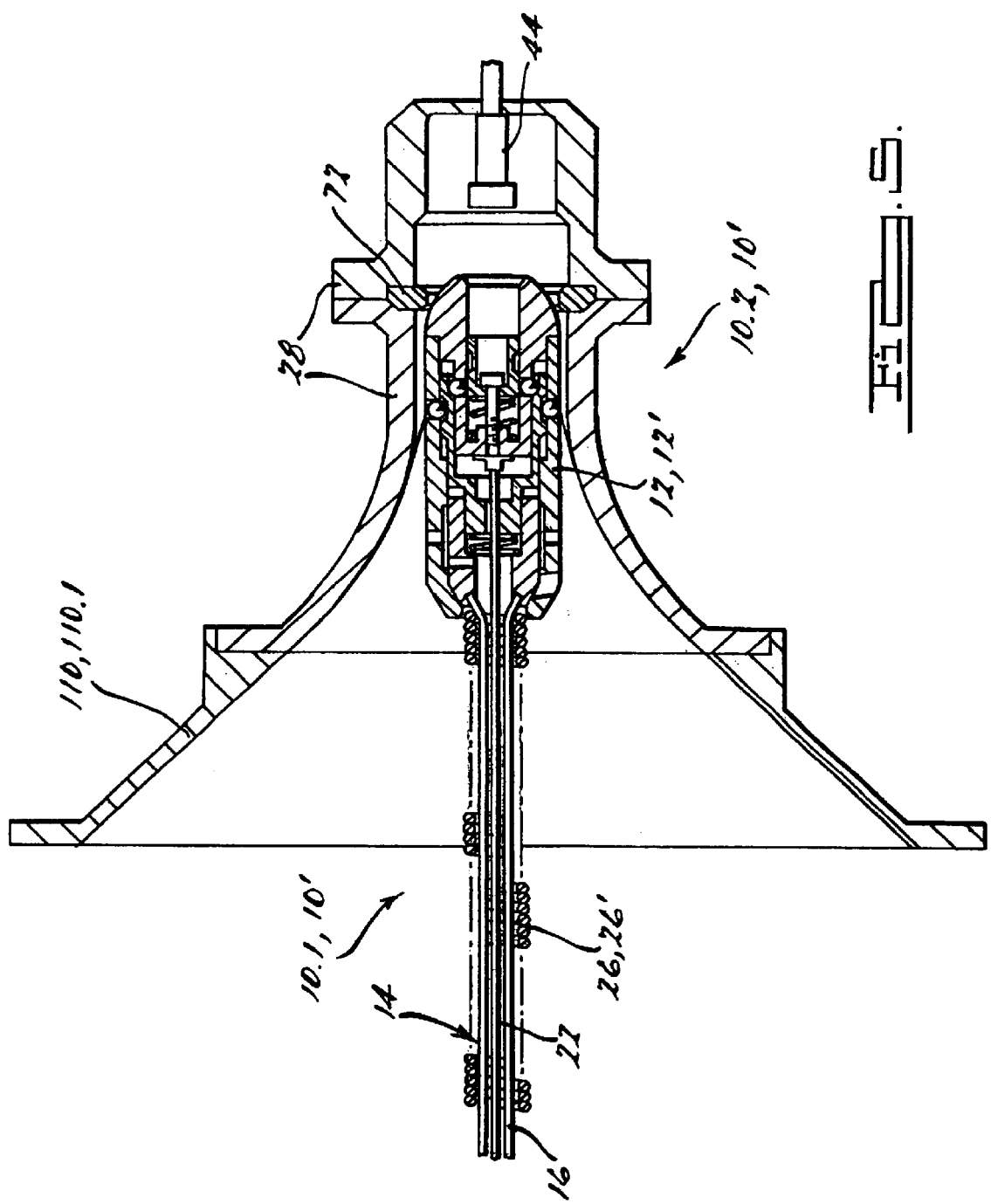

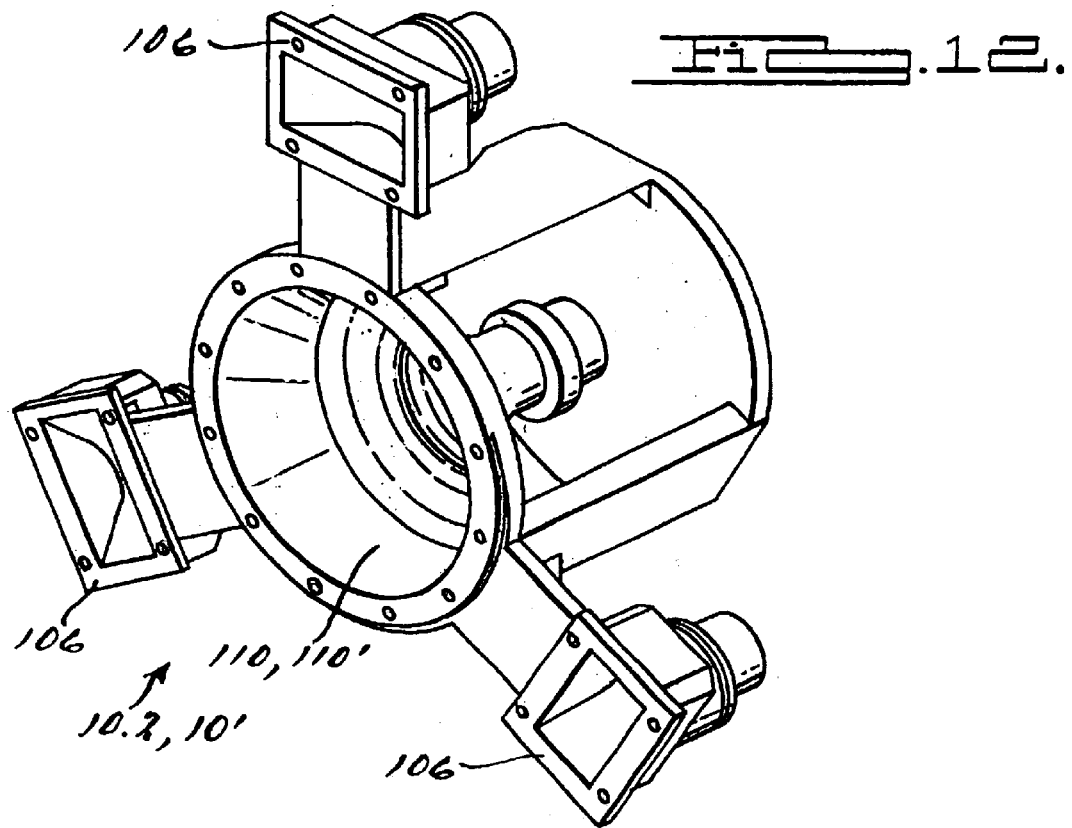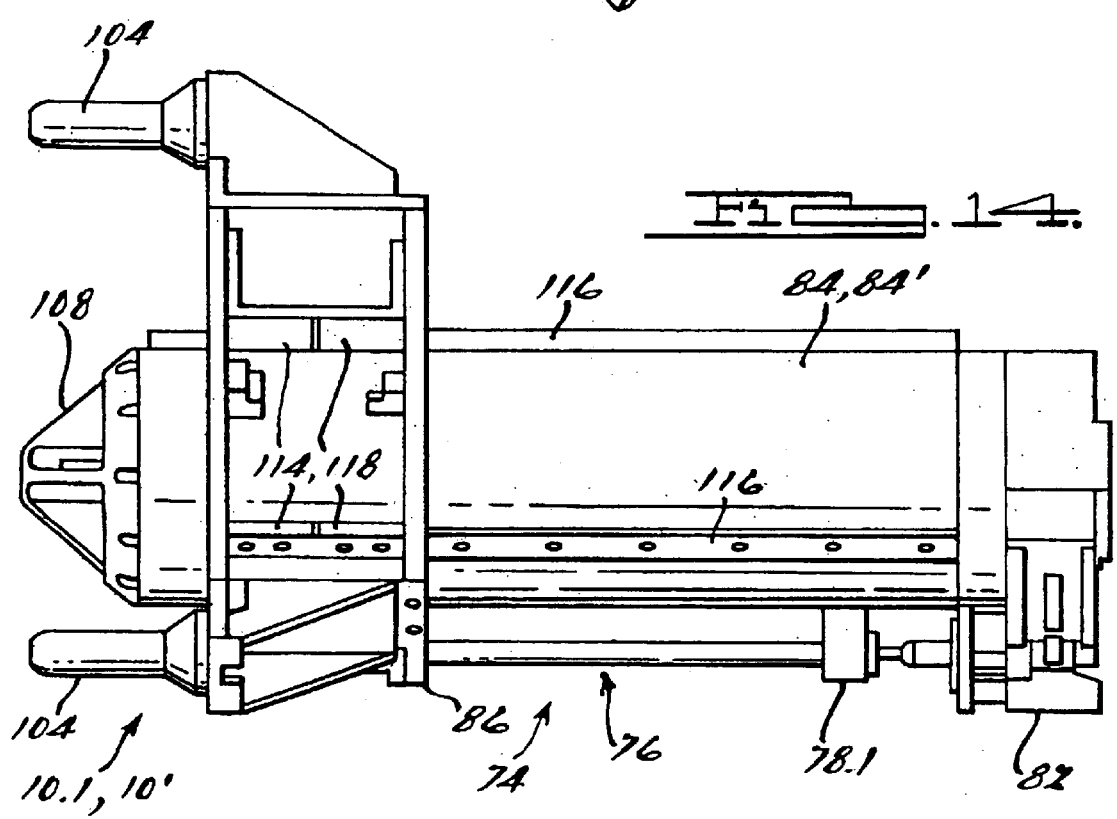

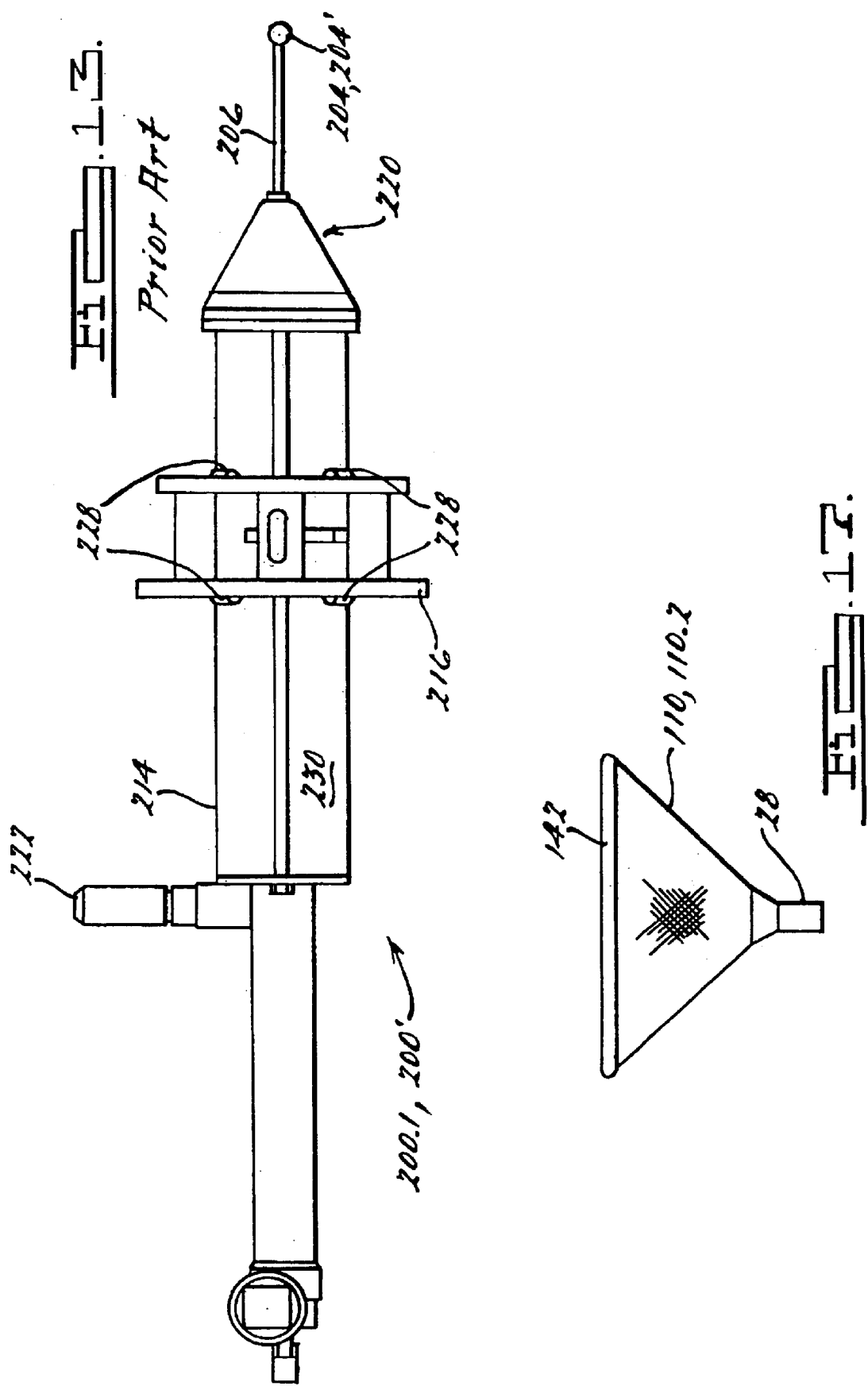

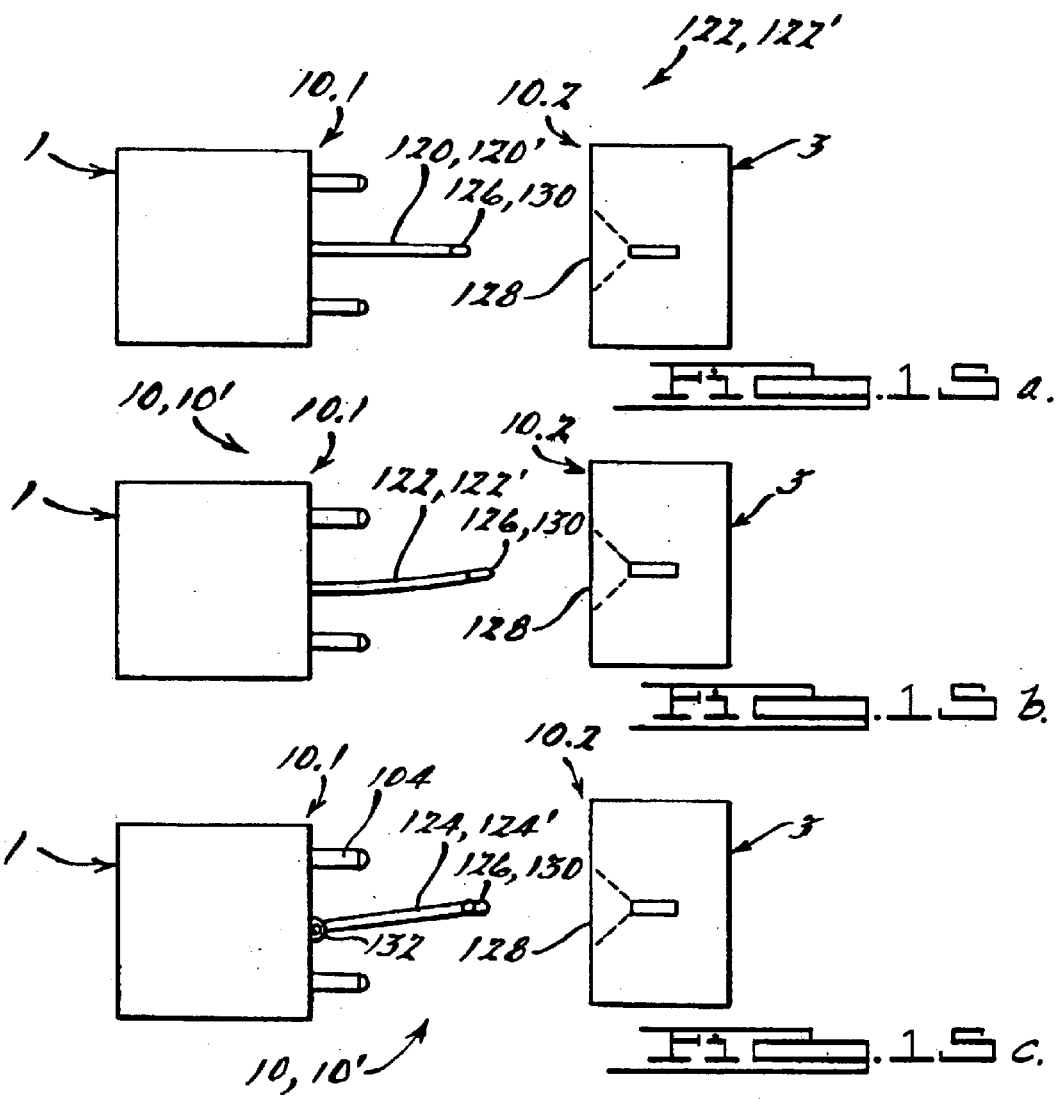
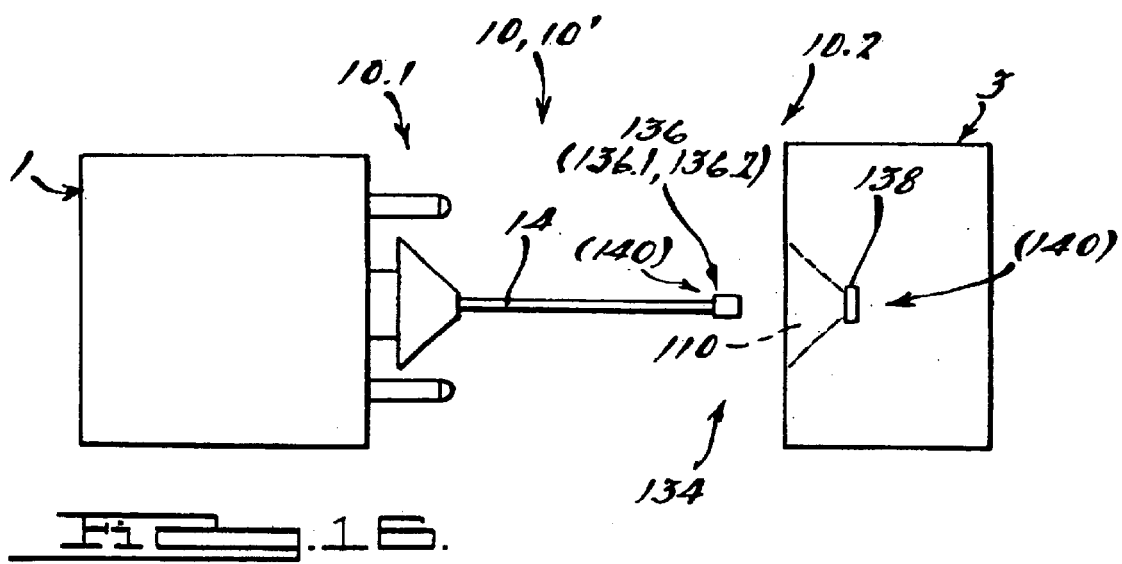

AUTONOMOUS SATELLITE DOCKING SYSTEM

REFERENCE TO RELATED APPLICATION

This application claims priority from U.S. Provisional Patent Application Ser. No. 60/416,138, filed Oct. 4, 2002; and is a continuation-in-part of U.S. patent application Ser. No. 10/286,192, filed Nov. 1, 2002, which claims priority from U.S. Provisional Patent Application Ser. No. 60/335,563, filed Nov. 1, 2001. The entire content of each application being incorporated herein by reference.

This invention was made with Government support under DAAH01-00-C-R012 and DAAH01-01-C-R015 awarded by the U.S. Army Aviation and Missile Command, with funding from the Defense Advanced Research Projects Agency (DARPA). The Government has certain rights in this invention.

FIELD OF THE INVENTION

This invention relates generally to spacecraft docking and, in particular, to a system of the type wherein all active components are disposed on a chase vehicle.

BACKGROUND OF THE INVENTION

There is interest in commercial uses of outer space, particularly earth orbit. This environment offers unique characteristics, such as zero gravity and unlimited vacuum, which may be useful to certain manufacturing processes. A major problem is the costs in launch and recovery of payloads.

One possible solution involves the use of a semi-permanent orbiting vehicle that is periodically serviced for refueling, resupply, and payload exchange. The most economical approach to such operations involves unmanned, unsupervised, autonomous rendezvous and docking vehicles. This requires capture and docking mechanisms which are simple and reliable, even in the presence of some misalignment. It would also be advantageous for the mechanism aboard the normally orbiting craft to be largely passive, thereby preserving power resources for other, perhaps more critical uses.

Existing spacecraft coupling structures typically take the form of compatible male and female devices, such as a conical seating platform on one vehicle and a docking adapter on the other for alignment and coupling of the spacecraft. Such structures typically absorb the relative kinetic energy between the two space vehicles upon engagement, and upon coupling, rigidly and securely interconnect the two spacecraft until their desired disengagement or decoupling.

In most applications, attachment is accomplished by remotely controlling one spacecraft on earth. The controlled vehicle typically includes an elongate probe or grappling arm for insertion into the conical seating platform in the other vehicle. U.S. Pat. Nos. 5,735,488; 5,364,046; 4,177,964; 4,195,804; 4,391,423; and 4,588,150, and Japanese Patent No. 226,497 are illustrative of such structures.

The apparatus described in U.S. Pat. No. 5,735,488 includes an elongate grappling arm extending from a first space vehicle. A pair of inflatable bladders are positioned about the grappling arm for engaging an inner surface of the combustion chamber of a second vehicle upon inflation, and a pair of rear bladders are positioned about the grappling arm for engaging an inner surface of the nozzle downstream from the combustion chamber upon inflation. This aligns the grappling arm and the rocket propulsion nozzle. A pressurized fluid source is provided on the first space vehicle for supplying fluid pressure to the inflatable bladders, and a fluid control valve manifold selectively controls the release of pressurized fluid to the bladders. In operation, the grappling arm is inserted into the rocket propulsion nozzle, and the control valves are actuated to first inflate the front bladders and thereby interconnect the grappling arm and the rocket propulsion nozzle. The rear bladders are subsequently inflated to align a central axis of the grappling arm with a central axis of the rocket propulsion nozzle. Inflation of the rear bladders provides an axial reaction load to balance the axial load provided by the front bladders. Attaching the vehicles in space may be controlled from the earth by activating the control valves to inflate the bladders.

According to U.S. Pat. No. 5,364,046, a largely passive capture mechanism disposed on a first spacecraft includes a concave cone section with the narrower interior end to admit a ball of a predetermined diameter. When tripped, a capture device restricts the diameter of passage for capture of the ball. In the release position passage for the ball is unrestricted. The capture device is preferably reset by the other spacecraft to release the ball. A docking mechanism disposed on the second spacecraft includes a convex cone section constructed to mate with the concave cone section, ball at the end of a cable and a boom. The cable may be extended from or retracted to the apex of the convex cone section. A rotary drive coupled to the convex cone section permits relative rotation of the spacecraft. The boom may be extended from or retracted into the second spacecraft. The spacecraft dock by directing the extended ball into the cylinder, where it is captured. The cable and boom retract to dock. The active docking mechanism releases and resets the capture device to undock. A pyrotechnic cutter disposed inside the boom can cut the cable for emergency release.

SUMMARY OF THE INVENTION

This invention solves problems associated with prior-art soft-dock mechanisms by placing all active components of a soft-dock system on the chaser side of the mechanism, leaving the target side of the mechanism completely passive (i.e., requiring no power expenditure or self-actuated moving parts to operate). In particular, the active components are supported on the end of a flexible cable attached to the probe, or chaser, side of the device. These components act as a sort of spring-loaded "trap." Once the end of the probe passes into a receptacle on the target side, the mechanism is triggered, engaging it in such a way that it can no longer be pulled out of the receptacle until it is reset.

In an alternative embodiment of the invention, the soft-docking cable may be replaced with a rigid, semi-rigid or jointed post that is used to bring a capture mechanism into engagement with its corresponding receptacle or receiving structure. As a further alternative, the Harpoon latching cable end effector may be replaced with a magnetic latching device. The magnetic end effector can be either an electromagnet, which requires power to maintain the holding force, or a permanent magnet, which captures a target without power. As yet a further alternative, the main target cone may be either a metallic cone, or a non-metallic cone constructed of fabric, plastic, or other flexible material.

BRIEF DESCRIPTION OF THE DRAWINGS

FIG. 1 illustrates the Harpoon Capture Mechanism (Armed);

FIG. 2 illustrates the Harpoon Capture Mechanism Actuation Sequence;

FIG. 3 illustrates the Harpoon Capture Mechanism (Deployed);

FIG. 4 illustrates the ARD Soft-Dock Capture Mechanism;

FIG. 5 illustrates the ASDS Soft-Dock Capture Mechanism;

FIG. 6 illustrates the ARD Boom Extension System (Rack-and-Pinion);

FIG. 12 illustrates the ASDS Target-Side Indexing System Components;

FIG. 13 illustrates the ARD Boom Glide Components;

FIG. 14 illustrates the ASDS Boom Glide Components:

FIGS. 15a–c illustrates the rigid/semi-rigid/jointed post capture alternatives, respectively;

FIG. 16 illustrates the magnetic capture alternative components; and

FIG. 17 illustrates the fabric target cone alternative.

DETAILED DESCRIPTION OF THE INVENTION

Figure 7:
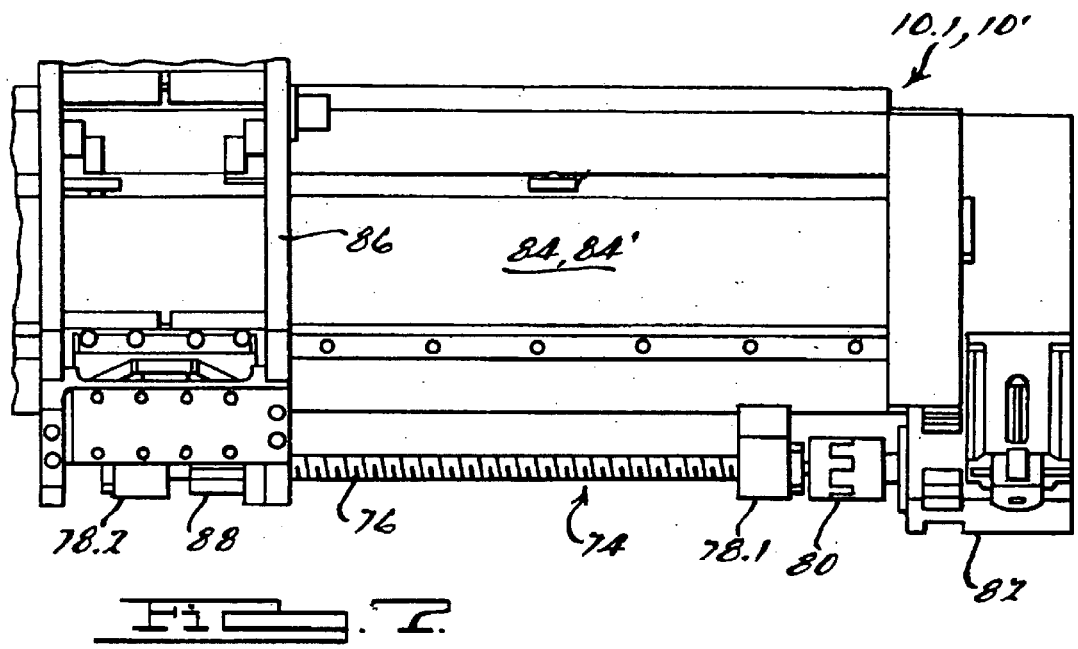
FIG. 7 illustrates the ASDS Boom Extension System (Ballscrew)

The invention will now be described in detail with reference to the Figures, using the following definitions:

Chaser 10.1—The half of a docking mechanism 10 that is attached to the satellite that is performing the servicing operation, or chase vehicle 1;

Target 10.2—The half of a docking mechanism 10 that is attached to the satellite that is being serviced, or target vehicle 3;

Soft-Dock—The capture of the target vehicle 3 by the chase vehicle 1 by a method that imparts little or no force on the target vehicle 3. This is in contrast to hard-dock which nominally involves a collision between parts of the chaser 1 and target 3 vehicles. Hard-dock procedures generally impart a great deal of force on the target vehicle 3, which can push it away before the docking mechanism is fully engaged;

Harpoon—The end effector 12 used by the chase vehicle 1 to capture the target vehicle 3;

ARD 100—The autonomous rendezvous and docking mechanism 100 described in U.S. Pat. No. 5,364,046; and ASDS 10'—The autonomous satellite docking system 10' according to the present invention, which includes the Harpoon end effector 12.

The operation of the Harpoon end effector 12 will now be described with particular reference to FIGS. 1–3.

The Components of the Harpoon End Effector

Docking Cable 14

Figure 9:
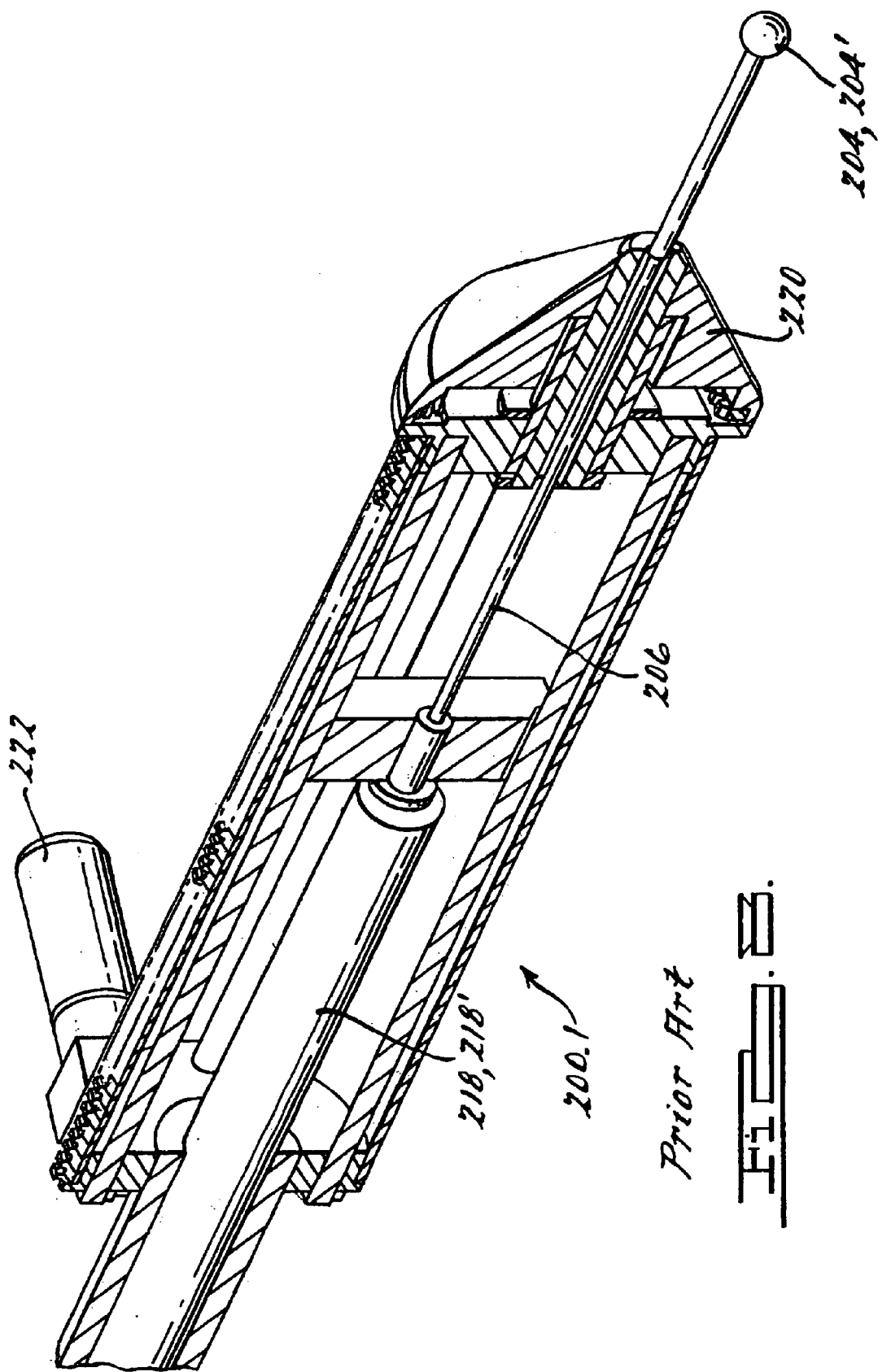
FIG. 9 illustrates the ASDS Cable Extension System (Ballscrew)

The Harpoon end effector 12 is attached to a docking cable 14, which is extended from the chaser side 10.1 of the docking mechanism 10. This docking cable 14 comprises a series of flexible load-bearing wire ropes or cables 16 that are fixed to the Harpoon base part 18 and the attachment platform 20 (see FIG. 9) of the chaser half 10.1 of the docking mechanism 10. Inside these load-bearing cables 16 is a control cable 22 that, when pulled back by a retraction mechanism 24 located inside the chaser half 10.1 of the docking mechanism 10, disengages and resets the Harpoon mechanism 12'. Outside of the docking cable 14 is a sheath 26 consisting of a tightly wound extension spring 26'. This sheath 26 both protects the inner cable components 16, 22 from abrasion or contamination and adds sufficient stiffness to the docking cable 14 to enable the docking cable 14 and sheath 26 to push the Harpoon end effector 12 into contact with a target receptacle 28 of a target vehicle 3.

Outer Shell 30

The outer shell 30 of the Harpoon end effector 12 is the main structural component of the Harpoon mechanism 12' containing all of the moving parts thereof. The outer shell 30 also holds a series of twelve outer ball bearings 32 in tapered holes 34 that prevent the ball bearings 32 from falling out of the Harpoon mechanism 12' when the Harpoon mechanism 12' is in a deployed state. The forward portion 36 of the outer shell 30 is threaded on the inside to accommodate an inner shell 38, and is rounded 40 to prevent snagging on the target receptacle 28 of the target vehicle 3 when the Harpoon end effector 12 is pushed into contact therewith.

Inner Shell 38

The inner shell 38 of the Harpoon end effector 12 is threaded into the outer shell 30, thereby containing all of the interior components (32, 56, 60, 62). Referring also to FIG. 5, the forward aperture 42 of the inner shell 38 is adapted to allow a triggering pin 44 in the target receptacle 28 to slide inside the Harpoon mechanism 12', depressing the trigger plunger 46 as the Harpoon end effector 12 is seated in the target receptacle 28 of the target vehicle 3.

Trigger Plunger 46 and Trigger Spring 28

The trigger plunger 46 slides inside of the inner shell 38 and is held in place by a trigger retaining screw 50, attached to the inner shell 38, that can be adjusted for depth. A trigger spring 48 between the trigger plunger 46 and the inner shell 38 biases the trigger plunger 46 in an extended position forward 52, as illustrated in FIG. 1. In this position, the outer cylindrical surface 54 of the trigger plunger 46 holds a set of inner ball bearings 56 outward in a corresponding set of holes 58 in the inner shell 38.

Inner Ball Bearings 56

The inner ball bearings 56 prevent an actuator sleeve 60 from sliding forward 52 in the Harpoon mechanism 12' until the trigger plunger 46 is depressed, after which, the inner ball bearings 56 are allowed to move radially inward toward the trigger plunger 46, clearing the way for the actuator sleeve 60 to be pushed forward 52.

Actuator Sleeve 60 and Actuator Spring 62

The actuator sleeve 60 is the main functional component of the Harpoon mechanism 12'. Referring to FIG. 2, after the trigger plunger 46 is depressed, a groove 64 therein aligns with the holes 58 in the inner shell 38 so as to receive the inner ball bearings 56 which then allow the actuator sleeve 60 to slide forward 52, the motion of which is responsive to an actuator spring 62 within the Harpoon mechanism 12', between the outer shell 30 and the actuator sleeve 60, held in compression when the Harpoon mechanism 12' is armed. When the actuator sleeve 60 is pushed forward 52 by the actuator spring 62, a ramped surface 66 of a groove 68 in the actuator sleeve 60 forces the outer ball bearings 32 outward until an outer cylinder surface 70 of the actuator sleeve 60 locks the outer ball bearings 32 in place. The control cable 22 is attached to the actuator sleeve 60. Retracting the control cable 22 pulls the actuator sleeve 60 back, resetting the Harpoon mechanism 12'.

Outer Ball Bearings 32

The outer ball bearings 32 hold the Harpoon end effector 12 in the target receptacle of the target vehicle 3 once the Harpoon mechanism 12' is deployed therein. The outer ball bearings 32 are allowed to move inward again once the Harpoon mechanism 12' is reset, thereby enabling the Harpoon end effector 12 to separate from the target receptacle 28.

Actuation of the Harpoon Mechanism

The Harpoon mechanism 12' is nominally kept in the armed configuration. The outer ball bearings 32 are allowed to move freely in and out of their deployed position, while the inner ball bearings 56 are held outwards by the trigger plunger 46 so as to prevent the actuator sleeve 60 from sliding forward 52 in its travel space. Referring also to FIG. 5, upon docking, the Harpoon end effector 12 enters the target receptacle 28 of the target vehicle 3 and slides through a capture ring 72 therein. The triggering pin 44 of the target vehicle 3 engages with the forward aperture 42 of the Harpoon end effector 12 and depresses the trigger plunger 46 against the trigger spring 48 sufficient to allow the inner ball bearings 56 to move into the a groove 64 in the trigger plunger 46, thereby moving the inner ball bearings 56 out of the way of the actuator sleeve 60, which is then pushed forward 52 in its travel space by the actuator spring 62. The outer ball bearings 32 are then forced outward by the ramped surface 66 on the outside of the actuator sleeve 60, and then locked in place once the outer cylindrical surface 70 adjacent the ramped surface 66 lies beneath the outer ball bearings 32, thereby placing the Harpoon mechanism 12' in a deployed state. The capture ring 72 is adapted to enable passage of an armed Harpoon end effector 12 therethrough, but to prevent passage of a deployed Harpoon end effector 12. Upon deployment, the outer ball bearings 32 are located forward of the capture ring 72 within the target receptacle 28, so that the Harpoon end effector 12 is thereby captured by the capture ring 72.

The Harpoon end effector 12 is retracted by pulling on the control cable 22, which pulls the actuator sleeve 60 back in its travel space, allowing the outer ball bearings 32 to slide inward, after which the Harpoon end effector 12 is free to be released from the target receptacle 28 of the target vehicle 3. Upon release, the Harpoon end effector 12 is pulled away from contact with the triggering pin 44 of the target vehicle 3, which allows the trigger plunger 46 to snap forward 52, pushing the inner ball bearings 56 outward again so as to engage with and retain the actuator sleeve 60 with the actuator spring 62 compressed, thereby re-arming the Harpoon mechanism 12'.

Differences Between ASDS and the ARD System

To assist in appreciating the ways in which the instant invention distinguishes over the prior art, a comparison will be made between the ASDS 10', and ARD system 200', described in U.S. Pat. No. 5,364,046.

Capture Mechanism

The ARD system 200', depicted in FIG. 4, utilizes an active latching receptacle 202 on the target side 200.2 and a passive brass sphere 204 attached to a steel docking cable 206 on the chaser side 200.1. (Although U.S. Pat. No 5,364,046 appears to describe the capture mechanism as being largely passive because the source of power or effort to actuate the capture mechanism is provided by the chase vehicle 1 to the target vehicle 3, rather than originating in the target vehicle 3, a mechanism is considered herein to be active if it requires a source of effort or power for the actuation thereof, regardless of the source of that effort or power). As the docking cable 206 and sphere 204 are extended from the chase vehicle 1, they seat into the bottom of a main target cone 208 on the target side 202.2, which provides for capturing the sphere 204 with the latching receptacle 202. The sphere 204 is released from the latching receptacle 202 by a capture mechanism release motor 209. The main drawback of this design is that it requires active components on both the chaser side 200.1 (docking cable 206 and boom extension and retraction systems 212, 218, 222) and the target side 200.2 (active latching and release systems 202, 209) of the docking mechanism 200.

This problem was addressed in the design of the ASDS 10' by locating all of the active latching components on the chaser side 10.1 (see FIG. 5). An active latching Harpoon end-effector 12 is mounted on the soft-docking cable 14 (rather than a passive brass sphere 204 as used in the ARD system 200'), allowing the chaser side 10.1 of the docking mechanism 10 to carry out all the active processes of closing the distance to the target vehicle 3, entering the target receptacle 28 of the target vehicle 3, latching in the target receptacle 18, retracting the docking cable 14 to bring the docking mechanism halves 10.1, 10.2 together in a hard-dock, and later releasing the docking mechanism 10 so as to provide for separating the chase 1 and target 3 vehicles.

Boom Extension Drive

The moving boom 210 of the ARD system 200' is driven by a rack-and-pinion gear system 212 (see FIG. 6). The rack 212.1 is attached to the boom body tube 214 and runs the entire length of the boom 210. The pinion 212.2, driven by a geared-down motor (not illustrated), is held in contact with the rack 212.1 to drive the boom 210 in or out of the mounting structure 216. The main reason for this type of docking mechanism 200 was that the ARD system 200' was designed to withstand a positive hard-docking impact and the geared motor system was intended to absorb this impact without damaging the structure or the spacecraft it was mounted on.

The docking mechanism 10 of the ASDS 10' is adapted to provide for soft-docking with minimal force imparted to either side, so the geared motor system as used in the ARD system 200' was unnecessary and would have been inefficient. Instead, a ballscrew-driven boom drive actuator 74 is used, comprising a ballscrew 76 supported by first 78.1 and second 78.2 ballscrew mounts, and driven through a spider coupling 80 by a motor and gearbox system 82 attached to the aft end of the main docking boom 84. The first ballscrew mount 78.1 is attached to the main dicking boom 84, and the second ballscrew mount 78.2 is attached to a mounting structure 86 by which the chaser half 10.1 of the docking mechanism 10 is mounted to the chase vehicle 1. The ballscrew 76 drives a ballscrew nut 88 on the ballscrew 76 between the first 78.1 and second 78.2 ballscrew mounts. The ballscrew nut 88 is attached to the mounting structure 86. In operation, the ballscrew 76 is rotated by the motor and gearbox system 82 through the spider coupling 80, The ballscrew 76 rotates freely within the first 78.1 and second 78.2 ballscrew mounts but reacts with the ballscrew nut 88 so as to cause the main docking boom 84 to translate relative to the mounting structure 86. The ballscrew-driven boom drive actuator 74 provides for more extension and retraction force with a smaller motor and gearbox system 82 due to fewer losses in the system and a greater mechanical advantage (see FIG. 7).

Cable Actuator System

Figure 8:
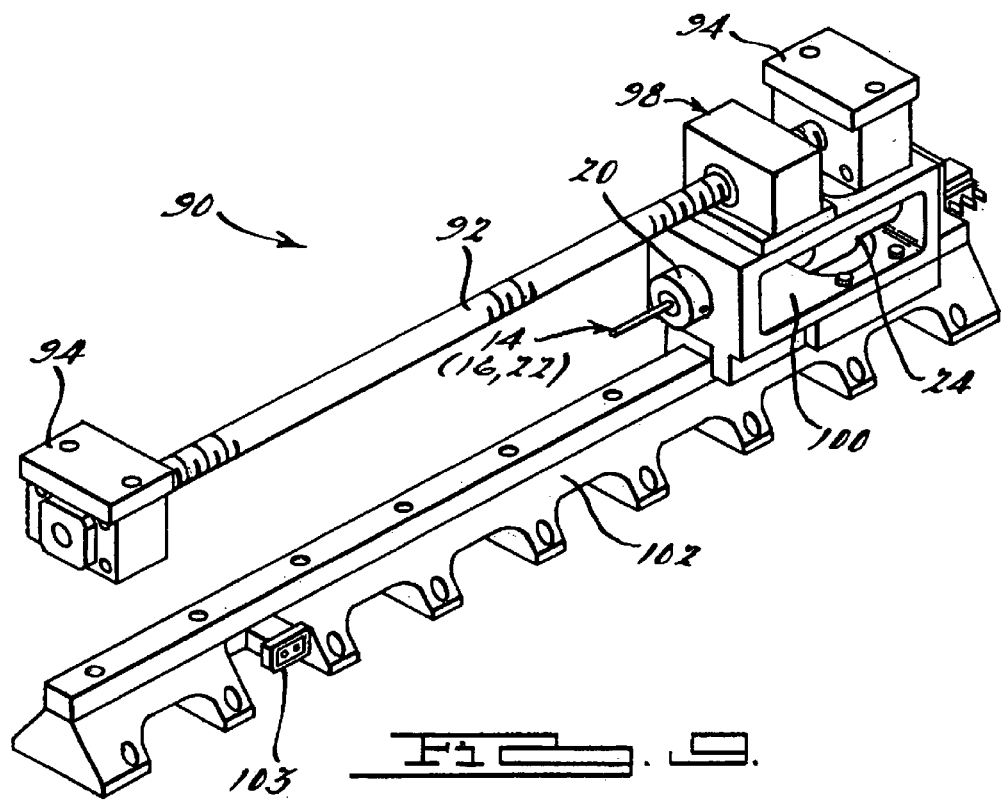
FIG. 8 illustrates the ARD Cable Extension System (Linear Actuator)

The cable actuator 218 of the ARD system 200' is simply a standard linear actuator 218' attached to the interior (aft) end of the docking cable 206, which design is not space-rated and takes up a great deal of volume (see FIG. 8).

In contradistinction, the ASDS docking mechanism 10 uses a ballscrew-driven cable actuator 90 that can be placed almost entirely inside the main docking boom 84. A single ballscrew 92 runs the length of the boom structure 84' and is supported therefrom by a plurality of ballscrew mounts 94. The ballscrew is driven by a geared motor 96 at the interior (aft) end of the main docking boom 84, and a ballscrew nut 98 on the ballscrew 92 between the ballscrew mounts 94 is operatively coupled to a cable shuttle 100. The docking cable 14 is attached to the cable shuttle 100, which is mounted on a linear rail 102 inside the main docking boom 84 to prevent the cable shuttle 100 from turning with the ballscrew 92 while allowing the cable shuttle 100 to move axially inside the main docking boom 84, the range of motion of which is limited by an end-of-travel microswitch 103 (see FIG. 9).

Cable End Effector

The end effector 204' of the ARD system 200' is a brass sphere 204 on the end of the docking cable 206.

In contradistinction, the ASDS docking mechanism 10 incorporates a Harpoon end effector 12 — which is active — at the end of the docking cable 14 so as to provide for having all the active components of the docking mechanism 10 on the chaser side 10.1 thereof (see FIGS. 1–3).

Mechanism Alignment System

Figure 10:
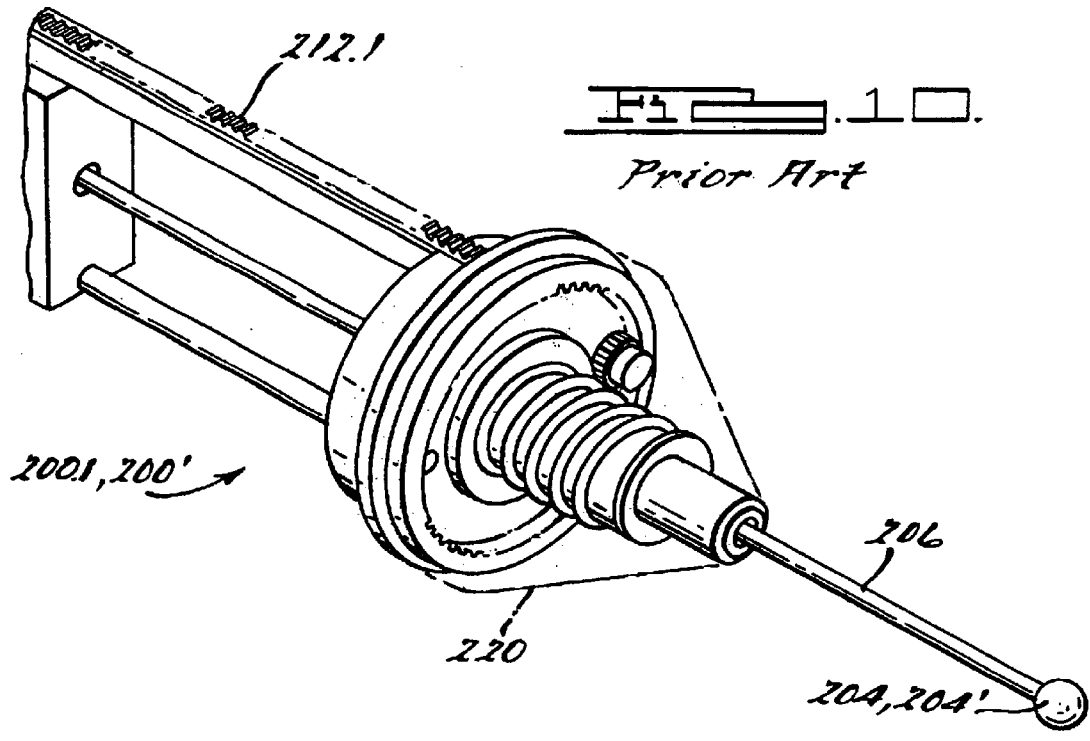
FIG. 10 illustrates the ARD Head Rotation Indexing System.

The ARD system 200' provides for rotational alignment of the chaser 200.1 and target 200.2 sides of the ARD docking mechanism 200 after docking by a rotatable boom head 220 actively driven by a motor 222 mounted aft of the boom 210. After the rotatable boom head 220 makes hard contact with the main target cone 208 of the target receptacle 224 of the target vehicle 3, the rotatable boom head 220 is rotated to index the ARD docking mechanism 200 into proper rotational alignment (see FIGS. 10 and 13). The rotatable boom head 220 can be rotated ±180 degrees so as to compensate for any rotational misalignment.

Figure 11:
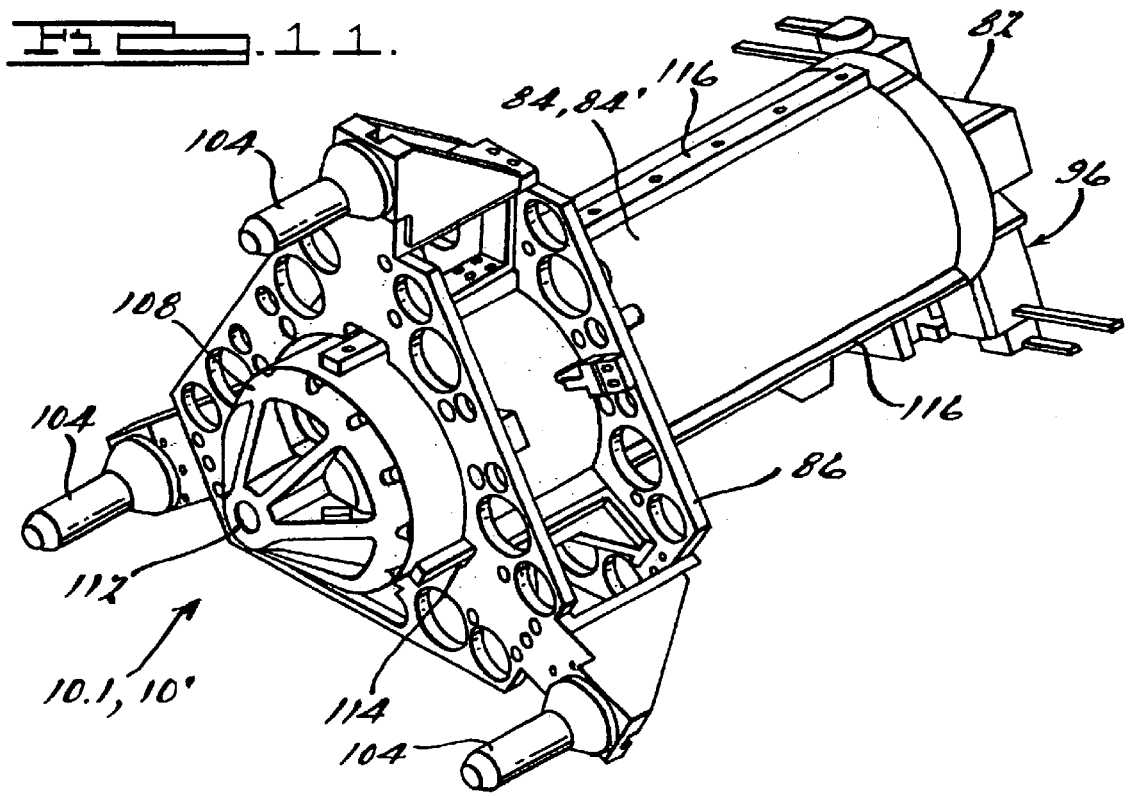
FIG. 11 illustrates the ASDS Chaser-Side Indexing System Components.

With the advent of modern sensors and guidance, navigation and control (GN&C) algorithms that are far more accurate at close range than similar systems during the time of the design of the ARD system 200', ±180 degrees of alignment correction is no longer required. Therefore, the ASDS 10' is simplified by instead using a trio of guideposts 104, attached to the mounting structure 86, that are adapted to slide into matching receptacles 106 on the target side 10.2 of the docking mechanism 10 so as to provide for auto-alignment thereof. While this arrangement does not provide as great a correction range as the active indexed rotatable boom head 220 of the ARD system 200', the larger range of rotational alignment correction is no longer required so that the ASDS 10' can be much simpler. A boom head 108 located on the forward 52 end of the boom is shaped so as to mate with a corresponding main target cone 110 on the target side 10.2 of the docking mechanism 10, and incorporates a central opening 112 through which the Harpoon end effector 12 and docking cable 14 are extended (FIGS. 11 and 12).

Boom Extension Glide Mechanism

The moving boom structure 210' on the ARD docking mechanism 200 is supported from the mounting plate 226 by eight aluminum rollers 228 that lay in direct contact with the outside skin 230 of the boom structure 210'. Due to the appearance of some surface galling on the ARD boom structure 210', later designs included a V-groove and track roller system, similar to that of the ARD docking mechanism 200 planned for orbit (see FIG. 13).

The ASDS docking mechanism 10 uses a series of linear ball-bearing guide shuttles 114 which cooperate with corresponding linear guides 116 so as to provide for rigidity of the system during testing. This was not intended to fly in orbit, as a space-rated version of the ball-bearing glides 118 used in the linear ball-bearing guide shuttles 114 does not currently exist in a practical form for use in the ASDS 10' (see FIG. 14).

In an alternative embodiment of the invention, the docking cable 14 may be replaced with a rigid 120, semi-rigid 122 or jointed 124 post that is used to bring a capture mechanism 126 into engagement with a corresponding target receptacle 28 or receiving structure 128 (see FIGS. 15a–c). The rigid post 120 design variant takes the form of a latching device 130, such as the Harpoon mechanism 12' described above, on the end of a non-flexible member 120' that is moved toward the target vehicle 3, either by actuated motion or by movement of the chase vehicle 1, until it engages a target receptacle 28 of a target vehicle 3 and successfully creates a connection between the two spacecraft 1,3. The semi-rigid post 122 variant takes the form of a slightly flexible, but stiff member 122' that is used in the same capacity as above, or of a rigid member 124' that is allowed to move in compliance with transverse motion. This might result from joints 132 placed at one or both ends of the rigid member 124' to allow it to align with the target receptacle 28 of the target vehicle 3.

As a further alternative, the Harpoon end effector 12 may be replaced with a magnetic latching device 134, which is generally utilized in the same manner as the Harpoon end effector 12, but uses an attraction force between a magnetic end effector 136 and a strike plate 138 on the target vehicle 3. The magnetic end effector 102 can, for example, be either an electro-magnet 136.1, which requires power to maintain the holding force, or a permanent magnet 136.2, which captures a target vehicle 3 without power. In the case of the permanent magnet magnetic end effector 136.1, an electro-magnet 140 in either the target vehicle 3 or magnetic end effector 136 itself is required to nullify the magnetic attraction for release, but power is only used to disengage in this version.

As yet a further alternative, the metallic main target cone 110 of the target vehicle 3 may be either a metallic cone 110.1 or a non-metallic cone 110.2, for example, constructed of fabric, plastic, or other flexible material, supported by a shape-retaining ring 142 at the opening thereof. A non-metallic cone 110.2 would guide the end effector (12, 136) of a given docking mechanism 10 into a corresponding target receptacle in the same manner as the metallic cone 110.1, but would represent a considerable reduction in mass and manufacturing complexity.

While specific embodiments have been described in detail in the foregoing detailed description and illustrated in the accompanying drawings, those with ordinary skill in the art will appreciate that various modifications and alternative to those details could be developed in light of the overall teachings of the disclosure. Accordingly, the particular arrangements disclosed are meant to be illustrative only and not limited as to the scope of the invention, which is to be given the full breadth of the appended claims and any and all equivalents thereof.

We claim:

1. A system for docking a chase space vehicle to a target space vehicle having a receptacle, comprising:
   a control member extending from the chase vehicle; and
   a device coupled to the end of the control member, the device facilitating:
   a) a deployed state wherein the device is coupled to the receptacle, and b) a disengaged state achieved by a pull on the control member, causing or providing for the device to freely disengage from the receptacle.

2. The system of claim 1, wherein the control member comprises a flexible cable.

3. The system of claim 1, wherein the control member comprises a rigid or semi-rigid post.

4. A system for docking a chase space vehicle to a target space vehicle having a receptacle, comprising:
   a control member extending from the chase vehicle, wherein the control member comprises a jointed post; and
   a device coupled to the end of the control member, the device facilitating:
   a) a deployed state wherein the device is coupled to the receptacle, and
   b) a disengaged state achieved by a pull on the control member, causing or providing for the device to be released from the receptacle.

5. A system for docking a chase space vehicle to a target space vehicle having a receptacle comprising:
   a control member extending from the chase vehicle; and
   a device coupled to the end of the control member, wherein the device comprises a Harpoon mechanism, the device facilitating:
   a) a deployed state wherein the device is coupled to the receptacle, and
   b) a disengaged state achieved by a pull on the control member, causing or providing for the device to be released from the receptacle.

6. The system of claim 1, wherein the device comprises a magnet or electromagnet.

7. The system of claim 1, wherein the receptacle comprises a metallic or non-metallic cone constructed of fabric, plastic, or other flexible material.

8. The system of claim 1, wherein the receptacle comprises a cone, and a surface of said cone comprises a flexible material.

9. The system of claim 1, wherein said flexible material comprises a non-metallic material.

10. The system of claim 1, wherein said flexible material comprises a fabric material.

11. A system for docking a chase space vehicle to a target to a target space vehicle having a receptacle, comprising:
    a control member extending from the chase vehicle, wherein the control member comprises a jointed post; and
    a device coupled to the end of the control member, the device facilitating:
    a) a deployed state wherein the device is coupled to the receptable, wherein the receptacle comprises a cone, a surface of said cone comprises a flexible material, and said cone further comprises a shape retaining ring, and
    b) a disengaged state achieved by a pull on the control member, causing or providing for the device to be released from the receptacle.

12. A system for docking a chase vehicle with a target vehicle, comprising:
    a. and end effector operatively coupled to the chase vehicle, wherein said end effector comprises a armed state and a deployed state; when in said armed state, said end effector is adapted to freely engage or disengage with a receptacle of the target vehicle; and when in said deployed state after an engagement with a receptacle of the target vehicle, said end effector is adapted so as to prevent a disengagement of said end effector from said receptacle; and
    b. a flexible member operatively coupling said end effector to said chase vehicle, wherein said flexible member provides for actuating said end effector from said deployed state to said armed state responsive to a tension applied to at least a portion of said flexible member from said chase vehicle.

13. A system for docking a chase vehicle with a target vehicle as recited in claim 12, wherein said flexible member comprises a control cable through which said tension is applied from said chase vehicle so as to provide for actuating said end effector.

14. A system for docking a chase vehicle with a target vehicle as recited in claim 12, wherein said flexible member comprises a least one load bearing element operatively coupled between said chase vehicle and said end effector, wherein said at least one load bearing cable provides for pulling said chase vehicle and said target vehicle together after said end effector is engaged with said receptacle and deployed in said deployed state.

15. A system for docking a chase vehicle with a target vehicle as recited in claim 14, wherein at least one said load bearing element comprises a load bearing cable.

16. A system for docking a chase vehicle with a target vehicle as recited in claim 15, wherein said flexible member comprises a least one load bearing element operatively coupled between said chase vehicle and said end effector, wherein said at least one load bearing cable provides for pulling said chase vehicle and said target vehicle together after said end effector is engaged with said receptacle and deployed in said deployed state.

17. A system for docking a chase vehicle with a target vehicle as recited in claim 12, wherein said flexible member comprises a sheath that provides for stiffening said flexible member.

18. A system for docking a chase vehicle with a target vehicle as recited in claim 17, wherein said sheath comprises an extension spring element.

19. A system for docking a chase vehicle with a target vehicle as recited in claim 12, further comprising a docking boom operatively coupled to said chase vehicle, wherein a forward end of said docking boom is adapted to mate with a target receptacle of the target vehicle, and said docking boom is adapted with a passage through which said flexible member is extended from said chase vehicle.

20. A system for docking a chase vehicle with a target vehicle as recited in claim 19, wherein said forward end of said docking boom has a substantially conical profile.

21. A system for docking a chase vehicle with a target vehicle as recited in claim 19, wherein said flexible member is operatively coupled to said docking boom.

22. A system for docking a chase vehicle with a target vehicle as recited in claim 19, wherein said chase vehicle and said docking boom are adapted so that said docking boom can be extended from or retracted to said chase vehicle.

23. A system for docking a chase vehicle with a target vehicle as recited in claim 22, further comprising a first actuator operatively coupled between said chase vehicle and said docking boom, wherein said first actuator is adapted to extend or retract said flexible member from or to said chase vehicle.

24. A system for docking a chase vehicle with a target vehicle as recited in claim 23, wherein said second actuator comprises a ball screw mechanism.

25. A system for docking a chase vehicle with a target vehicle as recited in claim 12, further comprising a second actuator operatively coupled between said flexible member and said chase vehicle, wherein said second actuator as adapted to extend or retract said flexible member from or to said chase vehicle.

26. A system for docking a chase vehicle with a target vehicle as recited in claim 25, wherein said second actuator comprises a ball screw mechanism operatively coupled to a load bearing portion of said flexible member.

27. A system for docking a chase vehicle with a target vehicle as recited in claim 22, further comprising a second actuator operatively coupled between said flexible member and said docking boom, wherein said second actuator is adapted to extend or retract said flexible member from or to said docking boom.

28. A system for docking a chase vehicle with a target vehicle as recited in claim 27, wherein said second actuator comprises a ball screw mechanism operatively coupled to a load bearing portion of said flexible member.

29. A system for docking a chase vehicle with a target vehicle as recited in claim 28, wherein said ball screw mechanism is operatively coupled to a carriage adapted to translate relative to said docking boom.

30. A system for docking a chase vehicle with a target vehicle as recited in claim 25, further comprising a third actuator operatively coupled to said chase vehicle, wherein said third actuator is adapted to actuate a control cable portion of said flexible member.

31. A system for docking a chase vehicle with a target vehicle as recited in claim 30, wherein said third actuator is operatively coupled to a carriage that is actuated by said second actuator.

32. A system for docking a chase vehicle with a target vehicle as recited in claim 31, wherein a load bearing portion of said flexible member is operatively coupled to said carriage, and said control cable portion of said flexible member is operatively coupled to said third actuator.

33. A system for docking a chase vehicle with a target vehicle as recited in claim 32, wherein said third actuator comprises a solenoid.

34. A method of providing for a chase vehicle to capture a target vehicle, comprising:
   a. providing for an end effector operatively coupled to the chase vehicle, wherein the operative coupling of said end effector to said chase vehicle comprises a flexible member extending from said chase vehicle to said end effector;
   b. providing for placing said end effector in an armed state, wherein when in said armed state, said end effector is adapted to freely engage or disengage with a receptacle of the target vehicle;
   c. providing for engaging said end effector with said receptacle of the target vehicle
   d. providing for automatically deploying said end effector responsive to an interaction of said end effector with said target vehicle, whereby said operation of deploying said end effector changes said end effector from said armed state to a deployed state within said receptacle so as to prevent a disengagement of said end effector from said receptacle; and
   e. providing for placing said end effector in said armed state from said chase vehicle so as to provide for disengaging said end effector from said receptacle, and the operation of placing said end effector in said armed state comprises pulling on at least a portion of said flexible member from said chase vehicle.

35. A method of providing for a chase vehicle to capture a target vehicle as recited in claim 34, further comprising providing for extending at least a portion of said flexible member from a docking boom prior to the operation of engaging said end effector with said receptacle of said target vehicle.

36. A method of providing for a chase vehicle to capture a target vehicle as recited in claim 35, further comprising providing for extending at least a portion of said docking boom from said chase vehicle prior to the operation of engaging said end effector with said receptacle of said target vehicle.

37. A method of providing for a chase vehicle to capture a target vehicle as recited in claim 36, further comprising providing for retracting at least a portion of said flexible member to said docking boom after said operation of deploying said end effector.

38. A method of providing for a chase vehicle to capture a target vehicle as recited in claim 37, further comprising providing for retracting at least a portion of said docking boom after said operation of deploying said end effector.

39. A method of providing for a chase vehicle to capture a target vehicle as recited in claim 38, wherein said docking boom and said flexible member are retracted until said docking boom engages with at least a portion of said receptacle of said target vehicle.

40. A system for docking a chase vehicle with a target vehicle, comprising an end effector operatively coupled to the chase vehicle, wherein said end effector comprises a plunger and an actuator sleeve; said plunger is biased towards an armed position thereof causing said actuator sleeve to be held in an armed position thereof; said plunger is adapted to be moved from said armed position to a deployed position responsive to an interaction thereof with an element of the target vehicle; when said plunger is moved to said deployed position thereof, said plunger provides for releasing said actuator sleeve, thereby providing for said actuator sleeve to move from said armed position to a deployed position responsive to a bias force within said end effector, whereby when in said deployed position after said end effector has been engaged with a receptacle of said target vehicle, said actuator sleeve provides for deploying said end effector so as to prevent a disengagement of said end effector from said receptacle of the target vehicle.

41. A system for docking a chase vehicle with a target vehicle as recited in claim 40, wherein said plunger is biased towards said armed position thereof by a first spring operative between said plunger and an inner shell of said end effector.

42. A system for docking a chase vehicle with a target vehicle as recited in claim 40, wherein said actuator sleeve is adapted to attach to a control member so as to provide for placing said end effector in said armed state responsive to a tension force applied to said control member.

43. A system for docking a chase vehicle with a target vehicle as recited in claim 40, wherein said actuator sleeve is held in said armed position by at least one first ball operative between said actuator sleeve, said plunger, and at least one corresponding first hole in an inner shell of said end effector.

44. A system for docking a chase vehicle with a target vehicle as recited in claim 40, wherein said bias force is generated by a second spring operative between said actuator sleeve and an outer shell of said end effector.

45. A system for docking a chase vehicle with a target vehicle as recited in claim 40, wherein said end effector comprises at least one second ball operative between said actuator sleeve and at least one corresponding second hole in an outer shell of said end effector, so as to provide for preventing disengagement of said end effector from said receptacle of said target vehicle.

46. A system for docking a chase vehicle with a target vehicle as recited in claim 40, wherein said at least one second ball cooperates with a capture ring of said receptacle so as to provide for preventing disengagement of said end effector from said receptacle of said target vehicle.

47. A method of providing for a chase vehicle to capture a target vehicle, comprising:
   a. providing for an end effector operatively coupled to the chase vehicle;
   b. providing for placing said end effector in an armed state, wherein when in said armed state, said end effector is adapted to freely engage or disengage with a receptacle of the target vehicle, and said plunger is biased towards a forward end of said end effector and said plunger is adapted to provide for retaining said actuator sleeve in an armed state;
   c. providing for engaging said end effector with said receptacle of the target vehicle
   d. providing for automatically deploying said end effector responsive to an interaction of said end effector with said target vehicle, whereby said operation of deploying said end effector changes said end effector from said armed state to a deployed state within said receptacle so as to prevent a disengagement of said end effector from said receptacle, wherein said end effector is deployed responsive to an interaction of said plunger with said target vehicle which releases said actuator sleeve from said armed state to a deployed state, thereby deploying said end effector; and
   e. providing for placing said end effector in said armed state from said chase vehicle so as to provide for disengaging said end effector from said receptacle.

48. A method of providing for a chase vehicle to capture a target vehicle as recited in claim 47, wherein said end effector is deployed responsive to a depression of said plunger within said end effector by a trigger pin in said receptacle.

49. A method of providing for a chase vehicle to capture a target vehicle as recited in claim 47, wherein said end effector is armed responsive to a force applied to said actuator sleeve by a tension in a control cable operatively coupled to said chase vehicle.

50. A System for docking a chase vehicle with a target vehicle, comprising an end effector operatively coupled to the chase vehicle, wherein said end effector comprises a permanent magnet adapted to cooperate with a magnetically attractive element of the target vehicle so as to provide for capturing said target vehicle with said chase vehicle, and at least one of the chase vehicle and the target vehicle comprises an electromagnet adapted to interact with said permanent magnet so as to provide for releasing said target vehicle from said chase vehicle.

51. A system for docking a chase vehicle with a target vehicle as recited in claim 50, wherein said electromagnet is located at least proximate to said end effector.

52. A system for docking a chase vehicle with a target vehicle as recited in claim 50, wherein said permanent magnet cooperates with a striker plate in a receptacle of said target vehicle so as to provide for attracting said permanent magnet to said receptacle.

53. A system for docking a chase vehicle with a target vehicle as recited in claim 50, wherein said electromagnet is located at least proximate to a receptacle of said target vehicle.

54. A system for docking a chase vehicle with a target vehicle, comprising a substantially conical element operatively coupled to the target vehicle adapted to receive an end effector from the chase vehicle, wherein said substantially conical element comprises a flexible material.

55. A system for docking a chase vehicle with a target vehicle as recited in claim 54, wherein said flexible material comprises a non-metallic material.

56. A system for docking a chase vehicle with a target vehicle as recited in claim 54, wherein said flexible material comprises a fabric material.

57. A system for docking a chase vehicle with a target vehicle as recited in claim 16, wherein said load bearing element comprises a plurality of load bearing cables, and said control cable is inside said plurality of load bearing cables.

* * * * *

UNITED STATES PATENT AND TRADEMARK OFFICE
CERTIFICATE OF CORRECTION

| | | |
|---|---|---|
| PATENT NO. | : 7,104,505 B2 | |
| APPLICATION NO. | : 10/421492 | |
| DATED | : September 12, 2006 | |
| INVENTOR(S) | : Peter Tchoryk, Jr. et al. | |

It is certified that error appears in the above-identified patent and that said Letters Patent is hereby corrected as shown below:

On the Title Page, Item (75) in the Inventors:
  "Pete Tchoryk" should read --Peter Tchoryk, Jr.--;
  "Jane Pavlich" should read --Jane Camile Pavlich--;
  "Greg Wassick" should read --Gregory Joseph Wassick--;
  "Anthony B. Hays, Howell, MI" should read --Anthony Beckman Hays, Jackson, MI--; and
  "Greg Ritter" should read --Greg Alan Ritter--.

On the Title Page, Item (57) in the Abstract:
  Line 17, "electro-magnet" should read --electromagnet--; and
  Line 20, "cone:" should read --cone;--.

On Page 2, Item (56) in U.S. PATENT DOCUMENTS:
  for U.S. Pat. No. 3,009,729: "Eskin" should read --Eakin--.

On Page 2, Item (56) in OTHER PUBLICATIONS:
  Line 2 under OTHER PUBLICATIONS, "Autonomous Satellite Docking Systems" should read --Autonomous Satellite Docking System--.

In Column 1:
  Line 7, --now U.S. Pat. No. 6,742,745,-- should be inserted before "which";
  The heading --STATEMENT REGARDING FEDERALLY SPONSORED RESEARCH OR DEVELOPMENT-- should be inserted before the paragraph beginning on Line 11;
  Line 11, --Contract Nos.-- should be inserted after "under"; and
  Line 15, --This invention was also made with Government support under Contract No. F29601-02-C-0007 awarded by the U.S. Air Force.-- should be inserted before "The Government".

In Column 3:
  Line 23, "illustrates" should read --illustrate--;
  Line 31, "Figures" should read --Drawings--;
  Line 41, "chaser" should read --chase--;
  Lines 48 and 49, "100" should read --200-- for each occurence;
  Line 55, "The Components of the Harpoon End Effector" should read --THE COMPONENTS OF THE HARPOON END EFFECTOR--; and
  Line 56, "Docking Cable 14" should read --Docking cable 14-- and should be underlined.

UNITED STATES PATENT AND TRADEMARK OFFICE
CERTIFICATE OF CORRECTION

PATENT NO. : 7,104,505 B2
APPLICATION NO. : 10/421492
DATED : September 12, 2006
INVENTOR(S) : Peter Tchoryk, Jr. et al.

It is certified that error appears in the above-identified patent and that said Letters Patent is hereby corrected as shown below:

In Column 4:
   Line 12, "Outer Shell 30" should read --Outer shell 30-- and should be underlined;
   Line 17, "ball bearings 32" should read --outer ball bearings 32--;
   Line 24, "Inner Shell 38" should read --Inner shell 38-- and should be underlined;
   Line 43, "Trigger Plunger 46 and Trigger Spring 28" should read --Trigger plunger 46 and Trigger spring 48-- and should be underlined;
   Line 43, "Inner Ball Bearings 56" should read --Inner ball bearings 56-- and should be underlined;
   Line 50, "Actuator Sleeve 60 and Actuator Spring 62" should read --Actuator sleeve 60 and Actuator spring 62-- and should be underlined; and
   Line 63, "outer cylinder surface 70" should read --outer cylindrical surface 70--.

In Column 5:
   Line 1, "Outer Ball Bearings 32" should read --Outer ball bearings 32-- and should be underlined;
   Line 3, "target receptacle" should read --target receptacle 28--;
   Line 9, "Actuation of the Harpoon Mechanism" should read --ACTUATION OF THE HARPOON MECHANISM--;
   Line 22, "the a" should read --the--;
   Line 50, "Differences Between ASDS and the ARD System" should read --DIFFERENCES BETWEEN ASDS AND THE ARD SYSTEM--; and
   Line 55, "Capture Mechanism" should read --Capture mechanism-- and should be underlined.

In Column 6:
   Line 2, "target side 202.2" should read --target side 200.2--;
   Line 14, "soft-docking cable 14" should read --docking cable 14--;
   Lines 19-20, "target receptacle 18" should read --target receptacle 28--;
   Line 24, "Boom Extension Drive" should read --Boom extension drive-- and should be underlined;
   Line 46, "dicking boom 84" should read --docking boom 84--; and
   Line 63, "Cable Actuator System" should read --Cable actuator system-- and should be underlined.

UNITED STATES PATENT AND TRADEMARK OFFICE
CERTIFICATE OF CORRECTION

PATENT NO. : 7,104,505 B2
APPLICATION NO. : 10/421492
DATED : September 12, 2006
INVENTOR(S) : Peter Tchoryk, Jr. et al.

It is certified that error appears in the above-identified patent and that said Letters Patent is hereby corrected as shown below:

In Column 7:
   Line 6, "ballscrew" should read --ballscrew 92--;
   Line 17, "Cable End Effector" should read --Cable end effector-- and should be underlined;
   Line 25, "Mechanism Alignment System" should read --Mechanism alignment system-- and should be underlined; and
   Line 57, "Boom Extension Glide Mechanism" should read --Boom extension glide mechanism-- and should be underlined.

In Column 8:
   Line 31, "magnetic end effector 102" should read --magnetic end effector 136--;
   Line 35, "permanent magnet magnetic end effector 136.1" should read --permanent magnet magnetic end effector 136.2--;
   Line 40, "metallic" should read "main target cone";
   Line 47, "target receptacle" should read --target receptacle 28--;
   Line 53, "alternative" should read --alternatives--; and
   Line 57, "limited" should read --limiting--.

In Column 9:
   Line 39, (line 1 of Claim 9), "of claim 1" should read --of claim 8--;
   Line 41, (line 1 of Claim 10), "of claim 1" should read --of claim 8--;
   Line 43, (line 1 of Claim 11), "to a target" should be deleted;
   Line 51, (line 9 of Claim 11), "receptable" should read --receptacle--;
   Line 59, (line 3 of Claim 12), "and end effector" should read --an end effector--; and
   Line 60, (line 4 of Claim 12), "a armed" should read --an armed--.

In Column 10:
   Line 18, (line 5 of Claim 14), "load bearing cable" should read --load bearing element--;
   Line 24, (line 3 of Claim 15), "a load bearing cable" should read --at least one load bearing cable--;
   Line 26, (line 2 of Claim 16), "in claim 15" should read --in claim 13--;
   Line 29, (line 5 of Claim 16), "load bearing cable" should read --load bearing element--; and
   Line 32, (line 8 of Claim 16), --, and said control cable is within said load bearing element-- should be inserted after "in said deployed state".

UNITED STATES PATENT AND TRADEMARK OFFICE
CERTIFICATE OF CORRECTION

PATENT NO. : 7,104,505 B2
APPLICATION NO. : 10/421492
DATED : September 12, 2006
INVENTOR(S) : Peter Tchoryk, Jr. et al.

It is certified that error appears in the above-identified patent and that said Letters Patent is hereby corrected as shown below:

In Column 11:
   Line 2, (line 4 of Claim 25), "as" should read --is--.

In Column 14:
   Line 3, (line 1 of Claim 50), "System" should read --system--;
   Line 18, (line 3 of Claim 52), "striker plate" should read --strike plate--; and
   Line 29, (line 5 of Claim 54), --, and said substantially conical element further comprises a shape retaining ring-- should be inserted after "flexible material".

Signed and Sealed this

Seventeenth Day of November, 2009

David J. Kappos
*Director of the United States Patent and Trademark Office*